(12) United States Patent
Olgaard et al.

(10) Patent No.: US 8,189,483 B2
(45) Date of Patent: May 29, 2012

(54) METHOD FOR MEASURING SENSITIVITY OF DATA PACKET SIGNAL RECEIVER

(75) Inventors: Christian Olgaard, Sunnyvale, CA (US); Carsten Andersen, Sunnyvale, CA (US)

(73) Assignee: Litepoint Corporation, Sunnyvale, CA (US)

(*) Notice: Subject to any disclaimer, the term of this patent is extended or adjusted under 35 U.S.C. 154(b) by 388 days.

(21) Appl. No.: 10/908,946

(22) Filed: Jun. 1, 2005

(65) Prior Publication Data

US 2006/0274657 A1   Dec. 7, 2006

(51) Int. Cl.
 *G01R 31/00* (2006.01)
(52) U.S. Cl. ........................ 370/241; 370/252
(58) Field of Classification Search ............... 370/241, 370/252
 See application file for complete search history.

(56) References Cited

U.S. PATENT DOCUMENTS

| | | | |
|---|---|---|---|
| 4,833,676 A | | 5/1989 | Koo |
| 4,897,842 A | | 1/1990 | Herz |
| 5,138,608 A | | 8/1992 | Kucera et al. |
| 5,479,452 A | * | 12/1995 | Hayes et al. ............... 375/344 |
| 5,617,237 A | * | 4/1997 | Bogdan et al. ............. 398/182 |
| 5,691,988 A | * | 11/1997 | Yamada et al. ............. 714/704 |
| 5,799,013 A | * | 8/1998 | Seshadri et al. ............ 370/342 |
| 5,910,977 A | | 6/1999 | Torresgrossa |
| 6,753,693 B2 | | 6/2004 | Seo et al. |
| 6,870,392 B2 | | 3/2005 | Kilian et al. |
| 6,986,086 B2 | | 1/2006 | Scholten |
| 7,057,518 B2 | | 6/2006 | Schmidt |
| 7,463,140 B2 | | 12/2008 | Schmidt |
| 7,564,893 B2 | | 7/2009 | O'Neill |
| 7,890,822 B2 | | 2/2011 | Behziz et al. |
| 2004/0185786 A1 | * | 9/2004 | Mirbaha et al. ............ 455/67.11 |
| 2005/0025188 A1 | * | 2/2005 | Numakura et al. .......... 370/490 |

FOREIGN PATENT DOCUMENTS

WO   WO 01/06684 A1 *  1/2001

OTHER PUBLICATIONS

International Search Report for PCT/US06/21190, dated Sep. 21, 2007, 3 pages.
Written Opinion for PCT/US06/21190, dated Sep. 21, 2007, 6 pages.
International Preliminary Report on Patentability for PCT/US06/21190, dated Dec. 12, 2007, 6 pages.
First Office Action and Translation issued in connection with co-pending China Patent Application No. 200680017706.2, China Patent Office, dated Mar. 13, 2009, 20 pgs.
IPOS Written Opinion issued in connection with co-pending Singapore Patent Application No. 200716732-3, Intellectual Property Office of Singapore, Dec. 18, 2008, 11 pgs.
IPOS 2nd Written Opinion issued in connectionwith co-pending Singapore Patent Application 200716732-3, Intellectual Property Office of Singapore, Sep. 18, 2009, 7 pgs.
First Office Action and Explanation of same issued in connection with co-pending Mexican Patent Application MX/a/2007/013642, Mexico Patent Office, Nov. 12, 2009, 9 pgs.
Office Action for Mexican Patent Application No. MX/a/2007/013642, 5 pages, dated Apr. 20, 2010.

(Continued)

*Primary Examiner* — Nittaya Juntima
*Assistant Examiner* — Mon Cheri Davenport (57) ABSTRACT

Methods for measuring the sensitivity of a data packet signal receiver are provided by varying the power level or modulation or both of a received data packet signal in a predetermined controlled sequence of data packet signals.

17 Claims, 7 Drawing Sheets

OTHER PUBLICATIONS

Australian Patent Office Examination Report for Patent No. 0716732-3, dated Apr. 14, 2010, 7 pages.
Australian Patent Office Examination Report, 6 pages, dated Apr. 14, 2010.
Notification of the Second Office Action for Chinese Application No. 200680017706.2 dated Sep. 29, 2010, 8 pages.
Notification of the Fourth and last Office Action for Mexican Patent Application No. MX/a/2007/013642 dated Jun. 7, 2011, 4 pages.
Japanese office action dated Oct. 11, 2011 for Japan patent application 2008-51-4827, English translation and in Japanese, 8 pages.
Notification of Vietnamese Office Action dated Sep. 30, 2011 for Vietnamese Application No. 1-2007-02355, 2 pages.

* cited by examiner

METHOD FOR MEASURING SENSITIVITY OF DATA PACKET SIGNAL RECEIVER

FIELD OF THE INVENTION

The present invention relates generally to testing electronic equipment for acceptable performance and more particularly, to the measurement of the sensitivity of a data packet signal receiver of a device under test (DUT).

BACKGROUND OF THE INVENTION

An electronic receiver forms a basic component in mobile cell phones, wireless personal computers (PCs), and wireless devices in general. Typically, a wireless device is tested for acceptable performance before leaving production facilities. Part of the testing of the wireless device may include testing the sensitivity of a receiver of the device. The sensitivity of the receiver may be tested by calculating a packet error rate (PER) for packets received by the receiver at a given power level. For example, a known number of packets at a predetermined power level are transmitted to the receiver and the number of packets correctly received by the receiver is calculated. The PER is the number of packets transmitted less the number of correctly received packets (i.e. the number of packets not correctly received) divided by the number of packets transmitted, usually expressed as a percentage. A passing score, for example, may be a PER of 10% or less. The predetermined power level is typically chosen at a test level higher than the assumed sensitivity of the receiver. For example, if the assumed sensitivity is −75 dBm (decibels relative to one milliwatt, and thus an absolute power level), the chosen test level may be −72 dBm. If the PER of a receiver is 10% or less for received packets transmitted at a power of −72 dBm, the receiver passes; else the receiver fails the test. If the test level was chosen at or very near the assumed sensitivity of the receiver, then a small variation in power level at the receiver, e.g. due to a loose connector, etc., may cause variable and inconsistent pass/fail test results. Thus, the test level is typically chosen at a point adequately higher than the assumed sensitivity to ensure a stable test result.

An alternative to the traditional testing described above is to search for the true or real sensitivity of the receiver. For example, the PER could be determined for a sequence of packets transmitted at one power level, and then a sequence of packets transmitted at another power level, and continuing in this fashion until a break point (e.g. a point of abrupt change) is found in the PER. The sensitivity is usually specified when the PER reaches a predefined level of, for example, 10% which is typically almost the same as the point of abrupt change. The power level at which the PER break point occurs may be chosen as the true sensitivity of the receiver, and, based on the found true sensitivity, pass or fail the receiver. However, determining the true receiver sensitivity may increase testing time as a number of iterations of a sequence of packets may have to be transmitted at varying power levels before finding the PER break point. In this case, the cost of testing for an acceptable receiver may grow as test time increases. Even so, determining the true receiver sensitivity may be very desirable.

For example, by tracking the true receiver sensitivity for receivers under test, the direction of change in sensitivity level from one receiver to a next, as well as the rate of change, may be known. A change in true sensitivity may be correlated to a change in suppliers for a receiver component. A worsening receiver sensitivity, if found and corrected in time, may prevent the return of failed devices for rework. In addition, modern digital receivers, unlike analog predecessors, do not typically degrade in sensitivity gradually. A large change in sensitivity (e.g. from passing a test to failing a test) may occur within 1 dB of received power. Thus, the true sensitivity break point as a function of power may be a very sharp change in a narrow range of power. Without knowing where the true receiver sensitivity is, or in what direction the true receiver sensitivity is changing, when receivers under test begin to fail, the risk is high that many receivers will fail at once during production testing.

In view of the above, improvements are needed to determine in a timely fashion (e.g. so as not to increase the test time significantly) the true receiver sensitivity for a receiver under test.

SUMMARY OF THE INVENTION

Methods are provided for measuring the sensitivity of a data packet signal receiver by varying the power level or modulation or both of a received data packet signal in a predetermined controlled sequence of data packet signals.

In an embodiment, a method is provided for measuring a sensitivity level of a data packet signal receiver having a sensitivity characteristic defined by an expected packet error rate (PER) versus a data packet signal power level, comprising: receiving first and second portions of a plurality of data packet signals having correspondingly first and second data packet signal power levels which are greater than and less than, respectively, a predetermined power level; computing from said received first and second portions of a plurality of data packet signals a total number of correctly received data packet signals; and determining, based on the total number of correctly received data packet signals, said expected PER versus said data packet signal power level.

In another embodiment, a method is provided for measuring a sensitivity level of a data packet signal receiver having a sensitivity characteristic defined by an expected packet error rate (PER) versus a data packet signal power level, comprising: receiving at least two portions of a plurality of data packet signals, each of said at least two portions having a different packet signal power level; computing from said received at least two portions of a plurality of data packet signals a total number of correctly received data packet signals; and determining, based on the total number of correctly received data packet signals, said expected (PER) versus said data packet signal power level.

In yet another embodiment, a method is provided for measuring a sensitivity level of a data packet signal receiver having a sensitivity characteristic defined by an expected packet error rate (PER) versus a data packet signal power level, comprising: receiving first and second portions of a plurality of data packet signals having correspondingly first and second data packet signal power levels which are greater than and less than, respectively, a predetermined power level; computing first and second PERs corresponding to said first and second portions of said plurality of received data packet signals, respectively; and comparing said first and second computed PERs to said expected PER.

In another embodiment, a method is provided for measuring a sensitivity level of a data packet signal receiver having a sensitivity characteristic defined by an expected packet error rate (PER) versus a data packet signal power level, comprising: receiving at least two portions of a plurality of data packet signals, each of said at least two portions having a different data packet signal power level; computing a PER for each of the at least two portions of a plurality of data packet signals; and comparing the computed PERs for the at least two portions to said expected PER.

In yet another embodiment, a method is provided for measuring a sensitivity level of a data packet signal receiver having a sensitivity characteristic defined by an expected packet error rate (PER) versus a data packet signal power level at an associated modulation, comprising: receiving first and second portions of a plurality of data packet signals having substantially equal data packet signal power levels and correspondingly first and second modulations which are greater than and less than, respectively, a predetermined modulation; computing from said received first and second portions of a plurality of data packet signals a total number of correctly received data packet signals; and determining, based on the total number of correctly received data packet signals, said expected PER.

In an embodiment, a method is provided for measuring a sensitivity level of a data packet signal receiver having a sensitivity characteristic defined by an expected packet error rate (PER) versus a data packet signal power level at an associated modulation, comprising: receiving at least two portions of a plurality of data packet signals, said at least two portions having data packet signals with substantially equal power levels, and each of said at least two portions having different modulations; computing from said received at least two portions a total number of correctly received data packet signals; and determining, based on the total number of correctly received data packet signals, said expected PER.

In another embodiment, a method is provided for measuring a sensitivity level of a data packet signal receiver having a sensitivity characteristic defined by an expected packet error rate (PER) versus a data packet signal power level at an associated modulation, comprising: receiving at least two portions of a plurality of data packet signals, the data packet signals of a portion of the at least two portions having substantially the same power level and modulation, and the power level and modulation differing between portions of the at least two portions; computing from said received at least two portions a total number of correctly received data packet signals; and determining, based on the total number of correctly received data packet signals, said expected PER.

BRIEF DESCRIPTION OF THE DRAWINGS

The invention will be more readily understood in view of the following description when accompanied by the below figures and wherein like reference numerals represent like elements.

DETAILED DESCRIPTION OF THE INVENTION

A method for measuring a sensitivity level of a data packet signal receiver in a device under test (DUT) is provided. Typically, a data packet signal receiver has a sensitivity characteristic defined by a curve showing packet error rate (PER) as a function of power level measured in dBm (absolute power level) or dB (relative power level). The shape of the curve or sensitivity characteristic remains about the same from one receiver to a next of the same type, except the curve may move left or right along the x-axis (dBm axis) corresponding to movement in the true sensitivity of a particular unit under test. Thus, the true sensitivity level of a particular data packet signal receiver may be described as one of a group of similar curves, and thus as one (e.g. one curve) of many pluralities (e.g. of many curves) of expected packet error rates (PERs) versus a plurality of data packet signal power levels.

Figure 1:
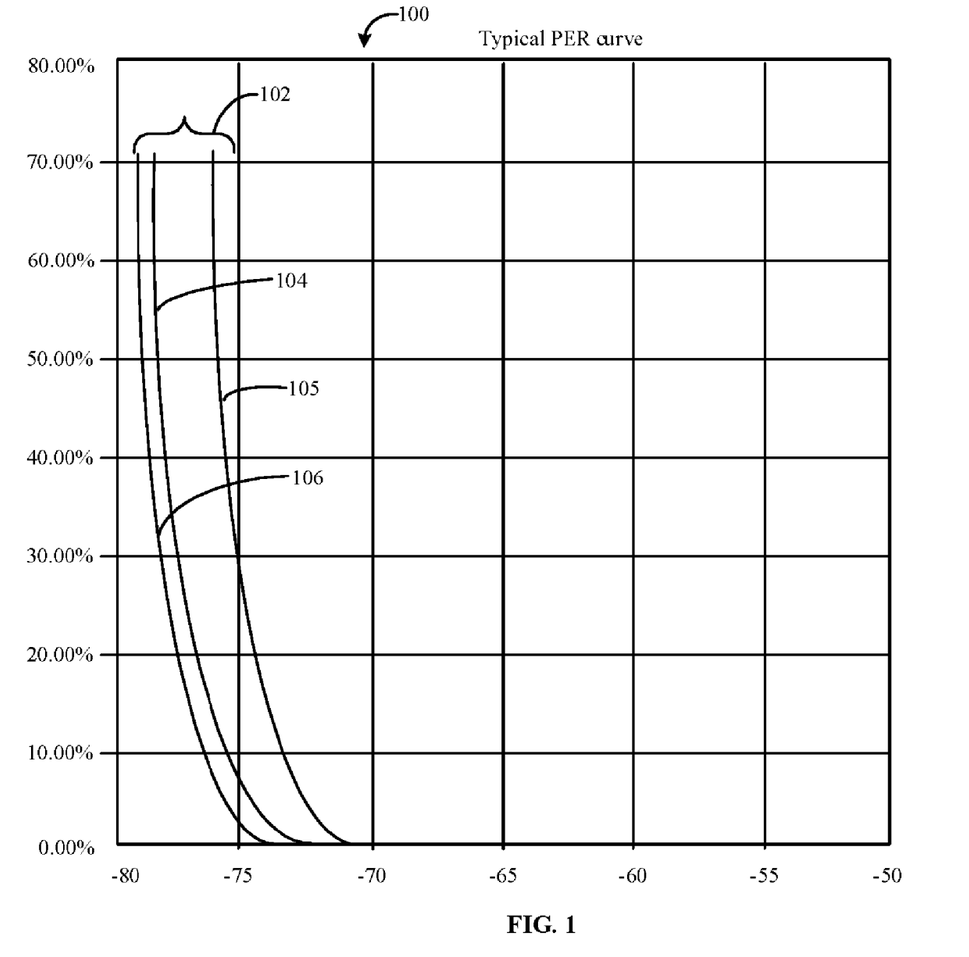
FIG. 1 illustrates a graph showing an example of a group of typical packet error rate (PER) curves that may be used to define the sensitivity characteristic of a type of data packet signal receiver.

FIG. 1 illustrates a graph 100 showing an example of a group of typical packet error rate (PER) curves 102 that may be used to define the sensitivity characteristic of a type of data packet signal receiver. One of the curves, e.g. curve 104, may describe or define the true sensitivity of a particular data packet signal receiver under test. The embodiments herein exemplify methods for determining the particular curve, e.g. the curve 104, of the group of typical PER curves 102, that best fits or matches as the true sensitivity level for a particular data packet signal receiver under test.

For example, data packet signals (also herein referred to as just data packets or packets) at three different power levels may be transmitted to the receiver under test. Doing so will test the receiver at three different power levels. For example, three consecutive packets correspondingly at −78 dBm, −75 dBm, and −72 dBm may be transmitted a predetermined number of times to the receiving unit. According to the graph 100 of FIG. 1, almost all of the packets at −78 dBm are expected to be lost if the true sensitivity of the receiver under test is curve 104. About 8% of the packets transmitted at −75 dBm are expected to be lost and almost all of the packets at −72 dBm should be correctly received. Assume that 100 data signal packets of each of the three power levels are received. Of the 300 packets transmitted, about 192 data packets would be expected to be received correctly if the receiving unit had a true sensitivity depicted by the curve 104. For example, all 100 packets transmitted at −72 dBm would be expected to be received correctly, 92 of the 100 packets transmitted at −75 dBm would be expected to be received correctly, and none of the 100 packets transmitted at −78 dBm would be expected to be received correctly. Thus, the sum of correctly received packets would be 192 packets of the 300 packets transmitted.

Suppose though, the receiver sensitivity shifts 1 dB lower (to −74 dBm from −75 dBm) and is represented by a curve 105 of FIG. 1. The expectation would be that about 30% of the packets transmitted at −75 dBm would be lost (according to the curve 105), but the two remaining levels should result in the same number of packets lost or received as before. Therefore, the receiver with a sensitivity of the curve 105 would be expected to receive about 170 packets correctly of the 300 packets transmitted. In contrast, if the receiver sensitivity shifts the other direction by one dB (to −76 dBm from −75 dBm), a curve 106 may approximate the true sensitivity of the receiver unit. In this case, the receiver with a sensitivity of the curve 106 would be expected to correctly receive 97 of the 100 packets received at −75 dBm, and a few of the packets received at −78 dBm may also be correctly received. Thus, the expectation is to correctly receive more than 200 packets of the 300 transmitted packets if the true sensitivity level of the receiver unit is modeled by the curve 106.

It should be understood from the above that the true sensitivity level may be determined for a data packet signal receiver under test from one single transmission of a group of data packets with varying power levels. As exemplified above, the total number of correctly received packets may be used to determine the true sensitivity or best fit curve for a particular data packet signal receiver. However, in most cases a curve fit for determination of true sensitivity level per se, would not need to be done, but rather the total number of correctly received packets, e.g. 100 out of 300, could be used to determine a pass/fail test result for a particular data packet signal receiver. Additionally, the total number of correctly received packets could be tracked for receivers under test to accumulate data to determine the direction of change and/or rate of change in the sensitivity level for the data packet signal receivers produced. Such accumulated data may be used in determining the causes for changes, e.g. a worsening sensitivity level may be correlated to a change in suppliers of a receiver component.

Figure 2:
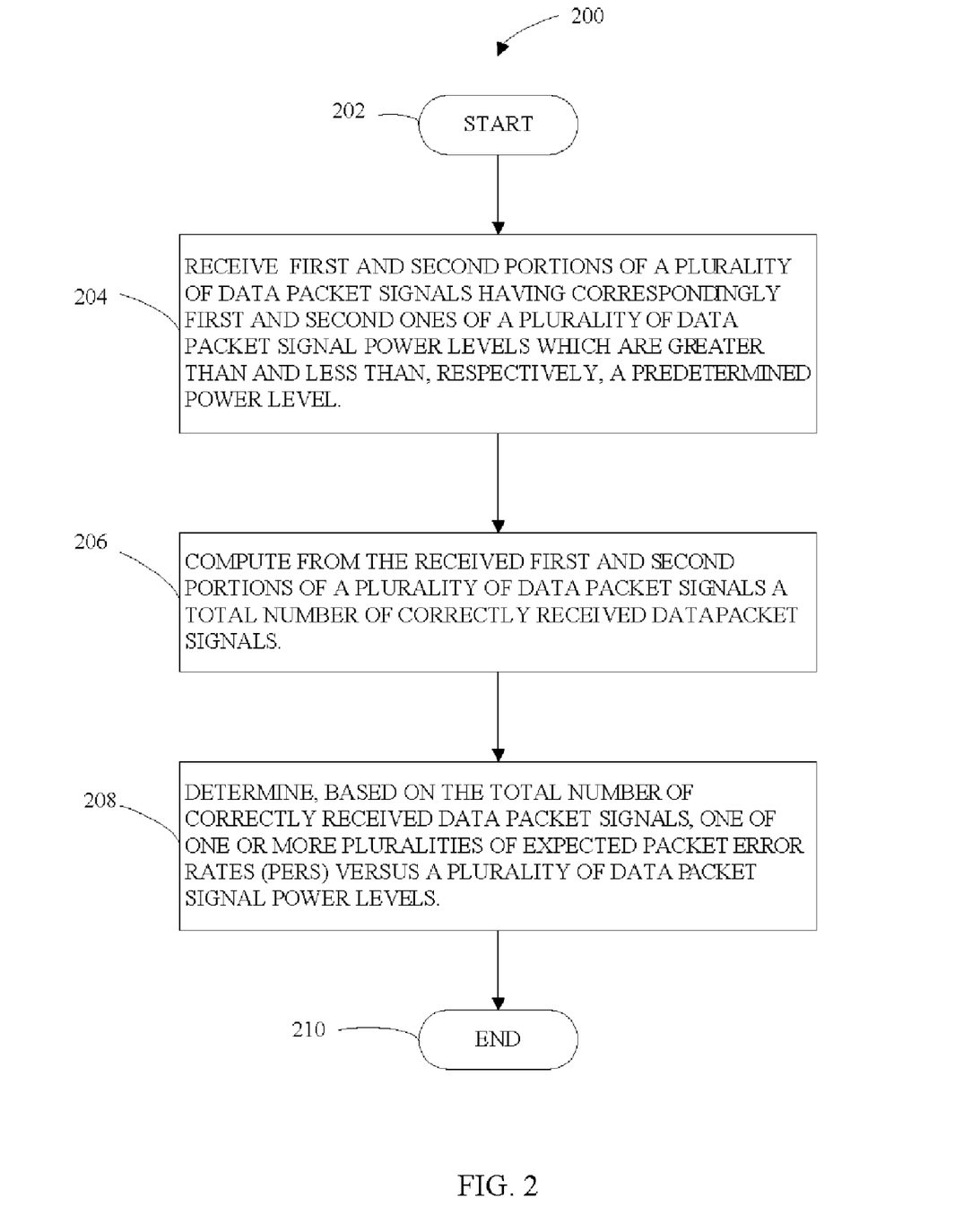
FIG. 2 illustrates a flowchart describing an example of a method for measuring a sensitivity level of a data packet signal receiver in accordance with an embodiment of the invention.

FIG. 2 illustrates a flowchart describing an example of a method 200 for measuring a sensitivity level of a data packet signal receiver in accordance with an embodiment herein described. The data packet signal receiver has a sensitivity characteristic defined by one or more pluralities (e.g. the group of typical PER curves 102 of FIG. 1) of expected packet error rates (PERs) versus a plurality of data packet signal power levels. The method 200 begins at start block 202 with the transmission of a plurality of data packet signals to a data packet signal receiver. Processing proceeds to block 204 which includes receiving the plurality of data packet signals as first and second portions having correspondingly first and second ones of power levels of a plurality of data packet signal power levels. The first power level (e.g. −72 dBm), corresponding to the first portion, is greater than a predetermined power level (e.g. −75 dBm), and the second power level (e.g. −78 dBm), corresponding to the second portion, is less than the predetermined power level. At block 206, a total number of correctly received data packet signals is computed from the first and second portions. Processing proceeds to block 208 which determines, based on the total number of correctly received data packet signals, one sensitivity (e.g. one curve or sensitivity, such as the curve 104 of FIG. 1) from the one or more pluralities (e.g. from a plurality of sensitivity curves, such as the group of typical PER curves 102 of FIG. 1) of expected packet error rates (PERs) versus a plurality of data packet signal power levels. At block 210, the method 200 ends with the determined sensitivity provided for test evaluation and sensitivity tracking.

In an alternative embodiment, the processing of block 208 instead of determining a sensitivity or sensitivity curve per se, compares the computed total number of correctly received data packet signals to a predetermined number. The computed total number of correctly received data packet signals of the method closely correlates to the sensitivity. If the computed total number of correctly received data packet signals is equal to or greater than the predetermined number, the data packet signal receiver passes testing; else the data packet signal receiver fails testing. The computed total number of correctly received data packets is still tracked from one tested receiver to a next to track the direction and rate of change in receiver sensitivity. At block 210, the method 200 ends with the receiver either passing or failing the test.

The determination of one curve or sensitivity at the block 208 may be made, for example, as follows. In this example, block 208 includes first selecting a data structure from a plurality of pre-constructed data structures (for example, a plurality of tables). The selection may be based on the first and second power levels (e.g. −72 dBm and −78 dBm) corresponding to the first and second portions, and on the number of packets transmitted in each of the first and second portions (e.g. 100 packets transmitted in each portion). The selected pre-constructed data structure may associate a total number of correctly received packets to a curve or sensitivity level. The total number of correctly received data packet signals may thus be compared to the selected pre-constructed data structure (e.g. the total number may be used as a key to perform a table lookup in a table data structure) to determine a curve or sensitivity level. For example, the selected pre-constructed data structure may return or determine the curve 104 of FIG. 1 for a total number of 192 packets correctly received from 300 packets transmitted. Or, if 170 packets were received correctly from the 300 packets transmitted, the selected pre-constructed data structure may return the curve 105 of FIG. 1. Thus, the selected pre-constructed data structure may be used to perform a lookup of the sensitivity level or sensitivity curve for the data packet signal receiver based on the total number of correctly received packets.

In an alternative embodiment, three power levels of data packets are transmitted. A first portion of data packets is transmitted at a power level (e.g. −72 dBm) above the predetermined power level (e.g. −75 dBm), another portion is transmitted at a power level (e.g. −78 dBm) below the predetermined power level, and a third portion is transmitted approximately at or equal to the predetermined power level. A pre-constructed data structure (for example, a table data structure), which may correspond to the three power levels of the transmitted packets and the number of packets transmitted in each of the three portions, is selected. The total number of correctly received data packet signals is then compared to the selected pre-constructed data structure (e.g. the total number may be used as a key to perform a table lookup on a table data structure) to determine a curve or sensitivity level from among the curves or sensitivity levels available in the selected pre-constructed data structure.

In yet another embodiment, at least two portions of a plurality of data packet signals are received, each portion having packets with different power levels. A total number of correctly received packets is computed from the received at least two portions. Then one of the one or more pluralities of expected packet error rates (PERs) versus a plurality of data packet signal power levels is determined based on the total number of correctly received packets. For example, a sensitivity curve, such as the curve 104 of FIG. 1, from a group of sensitivity curves, such as the group of typical PER curves 102 of FIG. 1, is determined. The determination may be made by first selecting, based on the data packet signal power levels associated with the at least two portions and the number of packets transmitted in each of the at least two portions, one of a plurality of pre-constructed data structures. Then the total number of correctly received data packet signals may be compared to the selected pre-constructed data structure to determine one of the one or more pluralities of expected packet error rates (PERs) versus a plurality of data packet signal power levels.

Figure 3:
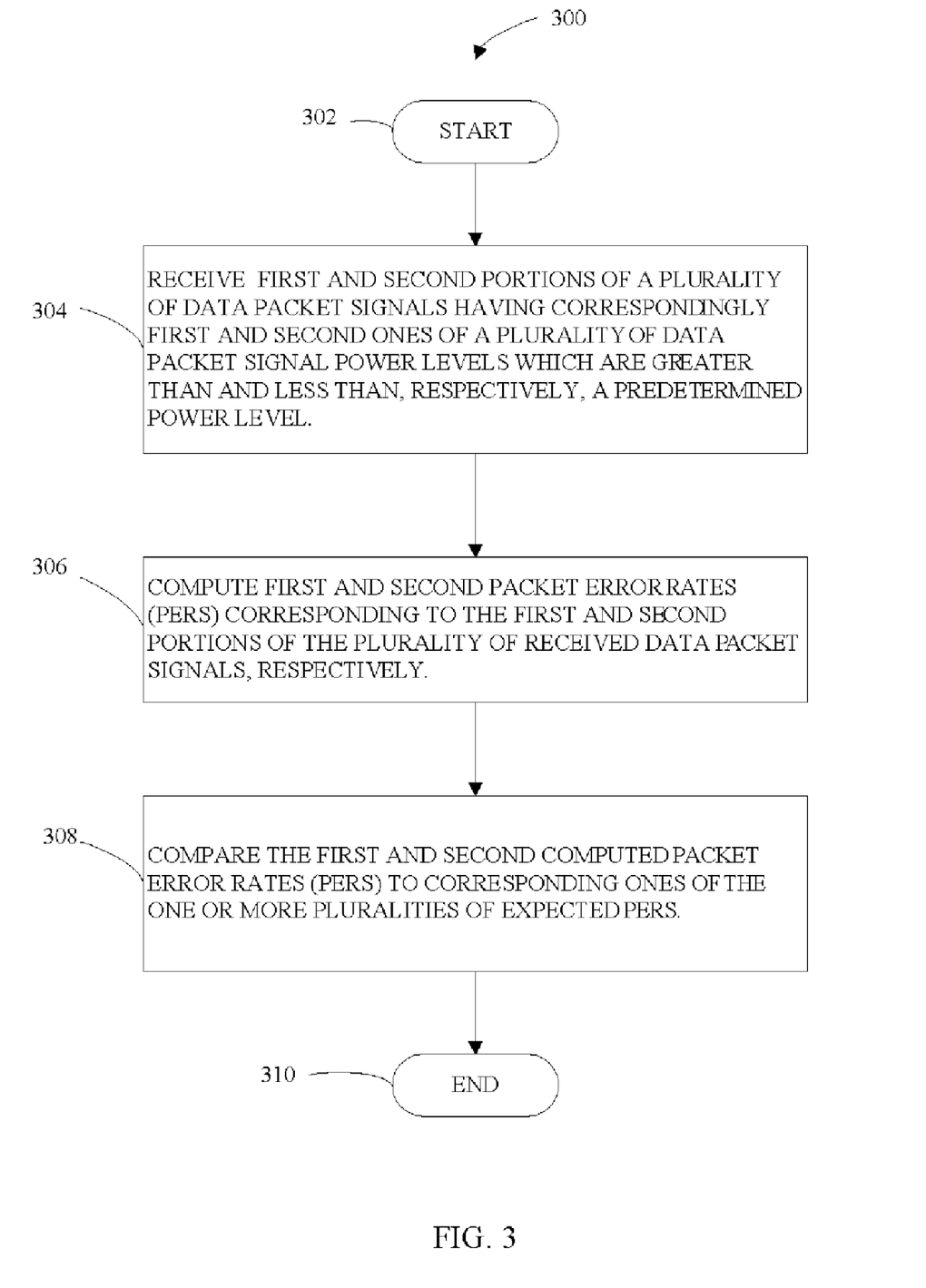
FIG. 3 illustrates a flowchart describing an example of a method for measuring a sensitivity level of a data packet signal receiver in accordance with another embodiment of the invention.

FIG. 3 illustrates a flowchart describing an example of a method 300 for measuring a sensitivity level of a data packet signal receiver in accordance with another embodiment herein described. The data packet signal receiver has a sensitivity characteristic defined by one or more pluralities (e.g. the group of typical PER curves 102 of FIG. 1) of expected packet error rates (PERs) versus a plurality of data packet signal power levels. The method 300 begins at start block 302 with the transmission of a plurality of data packet signals to a data packet signal receiver. Processing proceeds to block 304 which includes receiving the plurality of data packet signals as first and second portions having correspondingly first and second ones of power levels of a plurality of data packet signal power levels. The first power level (e.g. −72 dBm), corresponding to the first portion, is greater than a predetermined power level (e.g. −75 dBm), and the second power level (e.g. −78 dBm), corresponding to the second portion, is less than the predetermined power level. At block 306, first and second PERs are computed corresponding to the first and second portions of the plurality of received data packet signals. Processing then proceeds to block 308 which includes comparing the first and second computed PERs to corresponding ones of the one or more pluralities of expected PERS (e.g. one or more sensitivity curves, for example the group of typical PER curves 102 of FIG. 1) to determine the best fit or matching curve for the computed PERs. For example, a computed PER of 30% for a portion of packets transmitted with a power level of −76 dBm and a computed PER of 3% for a portion of packets transmitted with a power level of −74 dBm may, using the group of typical PER curves 102 of FIG. 1, determine or best match the curve 104 of FIG. 1. At block 310, the method 300 ends with the determined sensitivity provided for test evaluation and sensitivity tracking.

In an alternative embodiment, three power levels of data packets are transmitted. A first portion of data packets is transmitted at a power level (e.g. −72 dBm) above the predetermined power level (e.g. −75 dBm), another portion is transmitted at a power level (e.g. −78 dBm) below the predetermined power level, and a third portion is transmitted approximately at or equal to the predetermined power level. PERs are computed for the first, second, and third portions. The three computed PERs are then compared to find, e.g. used to match or best fit to, a sensitivity curve of a group of sensitivity curves, e.g. the sensitivity curve 104 may be a best fit or match from the group of typical PER curves 102 of FIG. 1.

In yet another embodiment, more than three portions, each portion with a different power level, of data packets are transmitted. PERs are computed for each of the received portions. The more than three computed PERs are then used to match or best fit to a sensitivity curve of a group of sensitivity curves, e.g. the sensitivity curve 104 may be a best match from the group of typical PER curves 102 of FIG. 1.

Figure 4:
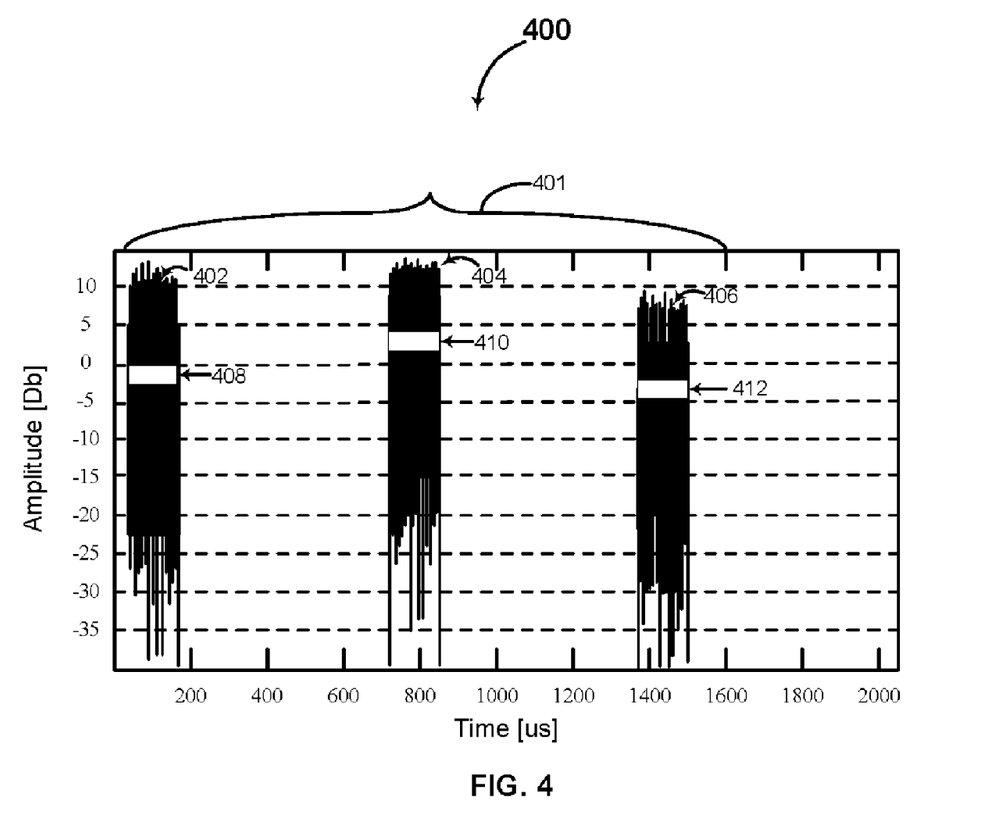
FIG. 4 illustrates a chart showing an example of a transmitted sequence of three consecutive data packet signals in accordance with an embodiment of the invention.

FIG. 4 illustrates a chart 400 showing an example of a transmitted sequence 401 of three consecutive data packet signals 402, 404, and 406 in accordance with an embodiment herein described. In this embodiment, each data packet signal has a different power level. For example, data packet signal 402 has a power level 408 of approximately −1 dB (relative to a reference power level), data packet signal 404 has a power level 410 of approximately +2 dB, and data packet signal 406 has a power level 412 of approximately −4 dB. The sequence 401 may be transmitted a predetermined number of times to provide the plurality of data packet signals transmitted to test the data packet signal receiver. Thus, an equal number of data packet signals may be transmitted at each power level to provide a first portion of data packet signals at −1 dB, a second portion of data packet signals at +2 dB, and a third portion of data packet signals at −4 dB.

The transmitting device may need to produce quick accurate changes in the power level or amplitude of consecutive packets, and for short separation times between packets, as shown by the example of FIG. 4. An approach for achieving such quick and accurate power level changes in consecutive packets may be to scale a baseband representation of the data packet signal to produce scaled baseband data packet signals. The scaled baseband data packet signals may then be converted and transmitted. Each scaled baseband data packet is converted to a data packet signal with a power level associated and corresponding to the scaling for the data packet. In this manner, consecutive data packet signals with quick and accurate changes in amplitude or power level may be produced and transmitted. The use of an external attenuator, in this case, may not be required.

For example, the baseband representation of a data packet signal may be a digital representation of the data packet signal in the digital domain. The scaled baseband data packet signal may be a scaled digital data packet signal. A first scaled digital data packet signal may be produced from the digital representation by multiplying the digital representation by a scaling factor, e.g. a scaling factor of 0.5. The digital representation may be multiplied by a different scaling factor, e.g. 0.7, to produce a second scaled digital data packet signal, and when multiplied by yet another different scaling factor, e.g. 0.3, may produce a third scaled digital data packet signal. The first scaled digital data packet signal when converted by a digital-to-analog (DAC) converter may produce the data packet signal 402 of FIG. 4. The second and third scaled digital data packet signals when converted by the DAC may correspondingly produce the data packet signals 404 and 406 of FIG. 4. The data packet signals 402, 404, and 406 may be transmitted as radio frequency (RF) data packet signals in the RF domain for receipt by the data packet signal receiver.

The scaled baseband data packet signals for producing the plurality of data packet signals for a receiver test may be stored in a memory of the transmitting device. The scaled baseband data packet signals may later be retrieved from the memory, when desired, and converted and transmitted. In an alternative embodiment, the scaled baseband data packet signals, e.g. the first, second, and third scaled baseband data packet signals corresponding to data packet signals 402, 404, and 406, are stored in a memory of the transmitting device. When desired, the stored scaled baseband data packet signals are retrieved, converted and repeatedly transmitted for some predetermined number of times to produce the transmitted train or plurality of data packet signals for testing of the receiver under test.

As described above for FIG. 4, there may be three portions, each portion with a different data packet signal power level. In an alternative embodiment, there may be two portions of a plurality of data packet signals, each portion having different data packet signal power levels. The sequence 401 of FIG. 4 may include only two packets, each at a different power level, and thus produce, when repeatedly transmitted, the two portions. In yet another embodiment, there may be more than three portions of a plurality of data packet signals, each portion having different data packet signal power levels. The sequence 401 of FIG. 4 may include more than three packets, each at a different power level, and thus produce, when repeatedly transmitted, more than the three portions.

Figure 5:
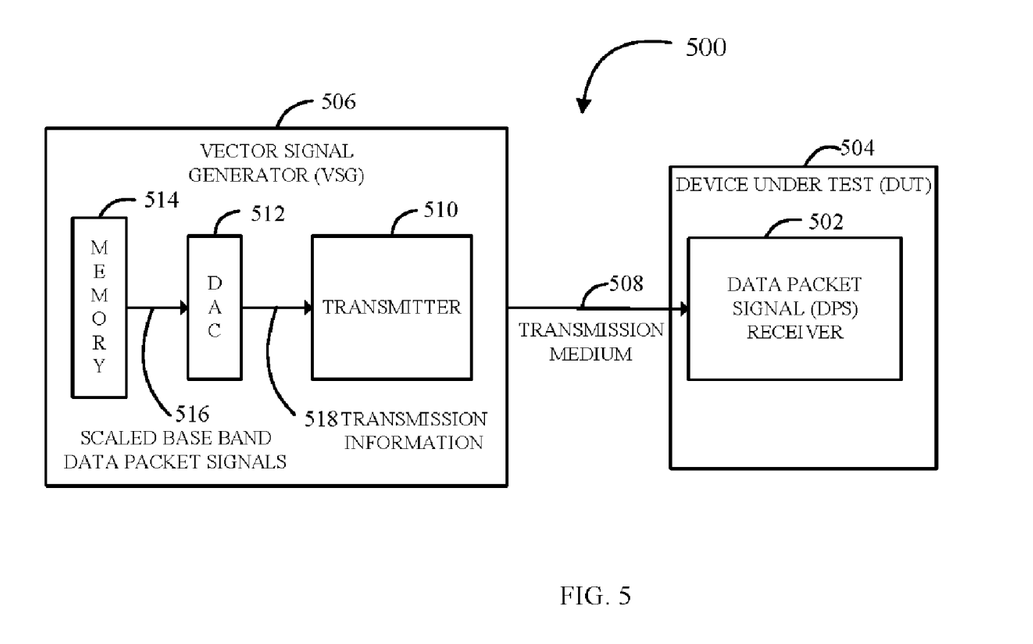
FIG. 5 illustrates a block diagram of an example of a test system configured for measuring a sensitivity level of a data packet signal receiver in accordance with an embodiment of the invention.

FIG. 5 illustrates a block diagram of an example of a test system 500 configured for measuring a sensitivity level of a data packet signal (DPS) receiver 502 of a device under test (DUT) 504. It may be the case that the DUT 504 is the DPS receiver 502, or as shown in FIG. 5, the DPS receiver 502 may be a digital signal processor (DSP) chip, e.g. an RF chip, that is a separate component from the DUT 504. The test system 500 has a transmitting device, e.g. a vector signal generator (VSG) 506, for transmitting a plurality of data packet signals for receipt by the DPS receiver 502 in testing of the DPS receiver 502. A transmission medium 508 allows for transmission of the plurality of data packet signals from a transmitter 510 of the VSG 506 to the DPS receiver 502. The transmission medium 508 may involve a wired or wireless connection.

As shown in FIG. 5, the VSG 506 includes a memory 514, a digital-to-analog converter (DAC) 512, and the transmitter 510. The memory 514 may be used to store scaled baseband data packet signals 516. The scaled baseband data packet signals 516 are retrieved from memory 514 and made available to the DAC 512 for producing the plurality of data packet signals as discussed previously for FIG. 4. For example, the scaled baseband data packet signals 516 may be scaled digital data packet signals that are input to the DAC 512 to produce the plurality of data packet signals as transmission information 518 for transmission by the transmitter 510. Either a subset or a complete set of scaled baseband data packet signals 516 may be stored in the memory 514 for use in generating the plurality of data packet signals. If only a subset is stored, the subset of scaled baseband data packet signals 516 once converted into the data packet signals for transmission may be transmitted a predetermined number of times to produce the plurality of transmitted data packet signals.

The DPS receiver 502 may or may not require the establishment of a link in order to receive the transmitted plurality of data packet signals. The situation may be that the DPS receiver 502 is a separate component from the DUT 504 and the DUT 504 may provide special drivers to the DPS receiver 502 to maintain the receiver 502 in a constant listening mode, waiting to receive the test sequence of packets.

In the situation wherein a link needs to be established before the receiver 502 is ready to receive, the link may be an asynchronous or synchronous link. Another device (e.g. a golden card) not shown in FIG. 5 may generate a link-establishing sequence of packets to the DPS receiver 502 to establish the link. Once the link is established, the golden card switches to the VSG 506 for the VSG 506 to generate the test sequence of packets.

In the situation of a link, the DUT 504 acknowledges a packet received, but as long as the VSG 506 does not transmit while the DUT 504 is sending the acknowledgement, no problem should occur. This may be easily achieved by inserting a gap or space between transmitted packets to allow time for receiving an acknowledgement of a previously transmitted packet. A standard or a specification normally specifies the minimum interval between packets, e.g. the 802.11 standard specifies 340 microseconds as the minimum spacing between packets. Thus, by inserting a spacing of at least 340 microseconds between transmitted packets, an 802.11 DUT 504 assumes the link present and functioning. The VSG 506 simply ignores the acknowledgements returned for packets transmitted.

An alternative to using an external device, such as a golden card, to establish a link is to "fake" the DUT 504 into a link. The VSG 506 may send an appropriate link-establishing sequence of packets to the DUT 504 to fake the DUT 504 into assuming a link is set up. For example, the VSG 506 may generate a link-establishing sequence of packets in accordance with the 802.11 standard to fake the 802.11 DUT 504 into assuming a link is established. After transmitting the link-establishing sequence of packets, the VSG 506 subsequently generates and transmits the test sequence of packets to the DPS receiver 502.

Two methods may be applied to distinguish between the link-establishing sequence of packets and the test sequence of packets. The first method halts or stops the VSG 506 when the number of received packets starts to increase, e.g. the link is established, in order to read the number of correctly received packets from the DUT 504. Stopping the VSG 506 briefly does not create a problem for an asynchronous link as typically the way the connection is established ensures the VSG 506 to be the master of the link. Thus, the transmission may be stopped briefly to read the number of correctly received packets from the DUT 504 after transmission of the link-establishing sequence of packets. The total number of correctly received packets after transmission of the test sequence of packets may thus be adjusted to take into account the number of correctly received packets received from the transmission of the link-establishing sequence of packets.

The other method discounts the number of correctly received packets from the link-establishing transmission of packets by knowing the number of packets transmitted in the link-establishing sequence of packets. Transmitting the link-establishing sequence of packets at an increased power level and at a lowest possible bit rate almost always succeeds in establishing a link. The known number of link-establishing packets, all assumed correctly received by the DUT 504, may be subtracted from the total number of correctly received packets after transmitting the test sequence of packets.

The situation wherein the link needed to be established is a synchronous link may require more care in the halting of the transmission by the VSG 506. However, persons with ordinary skill in the art can easily identify places in the link protocol at which transmission may be stopped and restarted without losing the link. Stopping the transmission briefly, then reestablishing the connection subsequently, should be a relatively simple task using the modern VSG 506 in connection with an internal or external trigger signal.

An alternative approach to transmitting packets at different power levels may be taken to still achieve the results of determining either the true sensitivity level of a data packet signal receiver (e.g. based on matching computed PERs to expected PERs), or a computed total number of correctly received packets that correlates to the true sensitivity level, without significantly increasing the test time. The alternative approach transmits a train of test packets at the same power level (so no change to the transmitted packets), but modulated differently. Instead of transmitting portions of packets with each portion having packets at a power level different from the packets of other portions, each portion differs from other portions by having the packets of the portion transmitted and received at a modulation different from the packets of other portions. The use of this approach assumes, though, having a system or receiver supporting multiple bit rates, e.g. like the IEEE 802.11 system.

Please note that the term "bit rate" may be used instead of "modulation" within this application, but what is sought by a change in bit rate or modulation is a change in sensitivity or SNR. Although lowering the bit rate may result in obtaining a better sensitivity, a better sensitivity is not necessarily guaranteed from lowering the bit rate. The bit rate could be lowered to transmit more power or occupy less bandwidth. Thus, the term modulation may be a better term than bit rate as a change in modulation results in a different sensitivity.

Figure 6:
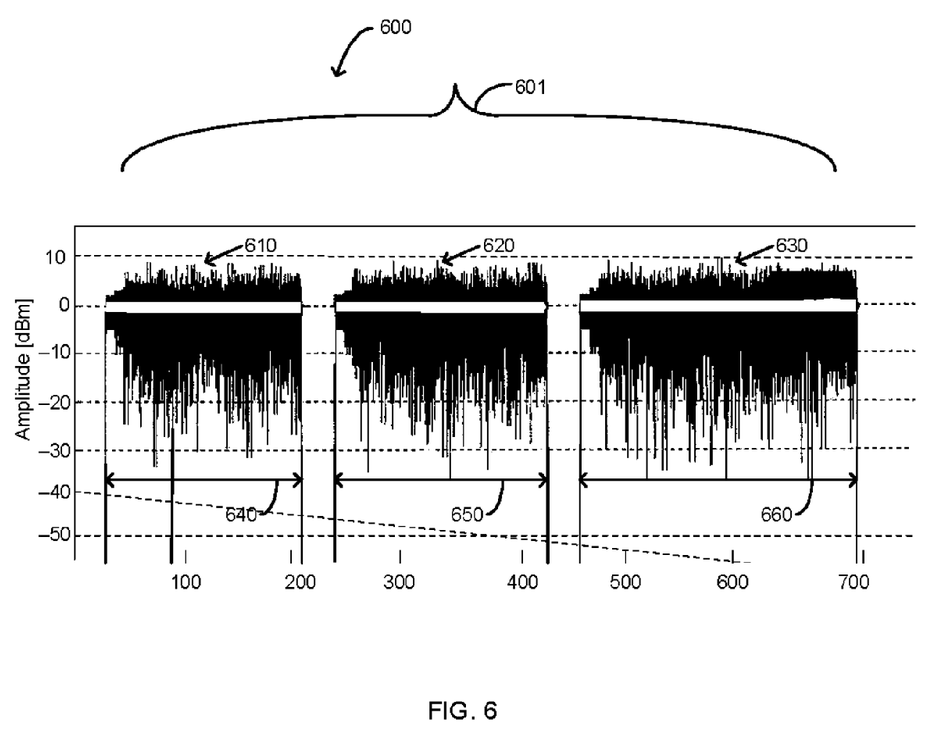
FIG. 6 illustrates a chart showing an example of yet another transmitted sequence of three consecutive data packet signals in accordance with an embodiment of the invention.

FIG. 6 illustrates, for example, a chart 600 showing an example of yet another transmitted sequence 601 of three consecutive packets 610, 620 and 630 in accordance with one embodiment. In this case, in contrast to FIG. 4, the three consecutive packets 610, 620, and 630 each have substantially the same power level, but each is transmitted and received at a different bit rate. For example, although each of the packets 610, 620, and 630 have the same number of bytes, packet 610 is transmitted in the time interval 640 which is different from the transmission time interval 650 for packet 620 which is different from the transmission time interval 660 for packet 630. For example, the time interval 640 may correlate to 54 Mbps, the time interval 650 to 48 Mbps, and the time interval 660 to 36 Mbps. Each of the three consecutive packets 610, 620, and 630 are at the same power level, but transmitted and received at different bit rates.

Typically, while keeping the power level the same for transmitted packets, a sensitivity (e.g. a PER of 10%) may be found corresponding to each of the bit rates for the DPS receiver 502. For example, the receiver 502 may have a sensitivity of −75 dBm for receiving packets transmitted at 54 Mbps, a sensitivity of −78 dBm for receiving packets transmitted at 48 Mbps, and a sensitivity of −80 dBm for receiving packets transmitted at 36 Mbps. If the power level of the transmitted packets is set to −78 dBm, the expectation would be to receive most or all of the packets transmitted at 36 Mbps, some of the packets transmitted at 48 Mbps, and very few of the packets transmitted at 54 Mbps. Thus, for example, the DPS receiver 502 with a sensitivity of −78 dBm receiving packets with a power level of −78 dBm may be expected to receive all of 100 packets transmitted at 36 Mbps, 90 of 100 packets transmitted at 48 Mbps, and none of 100 packets transmitted at 54 Mbps. Of the 300 packets transmitted, 190 would be expected to be received correctly if the receiver 502 has a sensitivity of −78 dBm. If the sensitivity of the receiver 502 is poorer, e.g. −75 dBm, then less than 190 of the 300 transmitted packets would be expected to be received correctly. If the sensitivity of the receiver 502 is better, e.g. −80 dBm, greater than 190 of the 300 transmitted packets would be expected to be received correctly. In testing a plurality of the DPS receivers 502, the computed total number of packets received correctly from some predetermined number of packets transmitted (transmitted with portions transmitted at different data bit rates) may be collected for each of the DPS receivers 502. The collected data may be used to indicate the direction of change and/or the rate of change in sensitivity of the tested DPS receivers 502. This end result is very similar to the end result achieved by the process of FIG. 2.

It should be understood from the above that a single transmission of a group of test packets may be received, the test packets transmitted with the same power level but varying bit rates, and when received by the DPS receiver 502, the total number of correctly received data packets may be compared to a predetermined number. As illustrated by the above example, the total number of correctly received packets may be closely correlated to the true sensitivity of the receiver 502. Thus, the direction of change and the rate of change in the sensitivity of tested DPS receivers 502 may be tracked by tracking the total number of correctly received packets.

Figure 7:
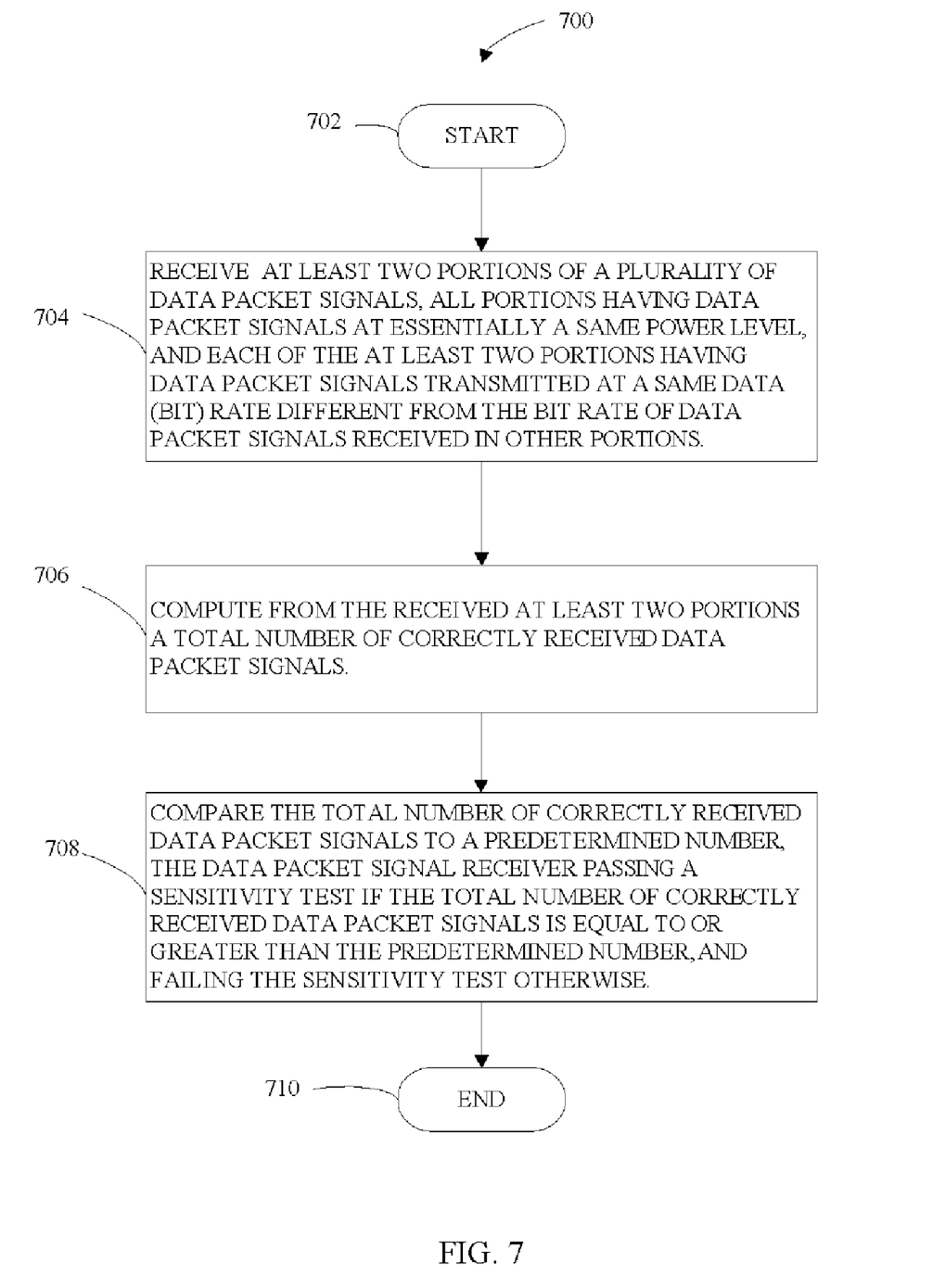
FIG. 7 illustrates a flow chart describing an example of a method for measuring a sensitivity level of a data packet signal receiver in accordance with an embodiment of the invention.

FIG. 7 illustrates a flow chart describing an example of a method 700 for measuring a sensitivity level of the DPS receiver 502 in accordance with an embodiment as described above. At block 702, the method 700 begins by transmitting a plurality of data packet signals to the DPS receiver 502. Each of the data packet signals has essentially the same power level, but each is transmitted at a bit rate of one of at least two different bit rates or portions. At block 704, the DPS receiver 502 receives the plurality of transmitted data packet signals. At least two portions of the plurality of data packet signals are received, each portion having packets with essentially the same power level. The packets of a received portion are transmitted at the same bit rate that is different from the transmission bit rate of packets of another portion. At block 706, the total number of correctly received packets is computed from the plurality of data packet signals received by the DPS receiver 502. At block 708, the total number of correctly received packets is compared to a predetermined number. The DPS receiver 502 passes a sensitivity test if the total number of correctly received packets is equal to or greater than the predetermined number, or fails the sensitivity test otherwise. At block 710, the test result (pass/fail) and the total number of correctly received packets are made available to the tester or user, and the method 700 ends.

In an alternative embodiment, at block 708 the total number of correctly received data packet signals is used to determine the sensitivity of the data packet signal receiver. The data packet signal receiver may pass or fail a test based on the determined sensitivity. At block 710, the sensitivity of the data packet signal receiver and/or test results are returned to the user or tester.

The method 200 of FIG. 2 may be more flexible than the method 700 of FIG. 7 due to the receiver's ability or inability to receive packets at different bit rates. However, when testing receivers that can receive at different data bit rates, an implementation advantage of the method 700 may be provided in using a DUT communications device instead of a VSG. A communications device typically can easily send packets with different data rates while keeping the same power level. For example, a so called "golden unit" may be used in place of the VSG to generate the packets. The golden unit typically can not change output power on a per packet basis, but usually can easily change the modulation (e.g. data bit rate) on a per packet basis. Thus the approach of changing the bit rate while keeping the power output the same for the transmitted packets is useful when testing with golden units. The golden unit obtains its name based on normally using a well characterized device, in this case for a transmission or generation source, and thus the name "golden unit".

It should be understood that the methods of FIG. 2 and FIG. 7 can also be combined. In doing so, the power of individually transmitted packets could be changed to achieve a desired spacing. For example, in the above description of FIG. 6, if the portion of packets received at −80 dBm were instead to be received at −81 dBm, one could do so by subtracting 1 dB of power from the 36 Mbps signal.

Combining the two methods may also provide the ability to satisfy a need to increase the dynamic testing range. For example, suppose 40 dB SNR is needed to ensure noise in the transmitted signal will not affect the measurement. If the VSG is capable of 60 dB dynamic range, the power may be varied from 40 to 60 dB (a range of 20 dB), but for signals like those of IEEE 802.1 a/g, 10 dB is taken for the peak to average of the signal. Thus, the VSG can only effectively change power over a dynamic range of 10 dB for a fixed RF gain. To increase the dynamic range further in the test system could be very expensive (e.g. both for power and cost). By combining the two methods of FIGS. 2 and 7, testing may be moved further up in sensitivity (obtaining an increased dynamic range) without having to reduce the signal to noise ratio (SNR), by increasing the modulation or data bit rate rather than lowering the power.

In addition, the combination of the methods could be used to test a gain step inside an RF chip. For example, if the low noise amplifier (LNA) in the front end of the receiver has two different gains, the sensitivity could be tested at both the high gain and the low gain. This could be done using the same signal in the VSG by using a packet train that covers, for example, a 20 dB range. If only scaling in power, one could have problems with SNR (depending on the VSG), but by combining modulation and power, a 20 dB dynamic range can easily be reached in the test with limited power variation. Naturally, the test levels (bit rates of the portions) will shift as the high gain LNA (best sensitivity) will receive most packet levels without loss, and the low gain will only receive a few levels. Still, this is acceptable, as long as the test limits are adjusted accordingly. Performing this test using a single packet train has the added advantage of slightly faster execution in case a long time is needed to adjust the VSG system gain, in which case the gain only needs to be adjusted once.

Among the many advantages, the embodiments described herein provide for determining the true sensitivity level of a data packet signal receiver under test, or a computed total number of correctly received packets that correlates to the true sensitivity level, without significantly increasing the test time. In addition, true sensitivity data, whether a best fit sensitivity curve or a computed total number of correctly received packets, for tested data packet signal receivers may be accumulated and tracked for later analysis. For example, by noting a trend or direction in the tracked sensitivity, e.g. a worsening or an improving sensitivity, a cause for the trend may be found, e.g. the trend may be correlated to a change in the supplier of a component of the receiver.

The above detailed description of the invention and the examples described therein have been presented for the purposes of illustration and description only and not by limitation. For example, the operations described may be done in any suitable manner. The method steps may be done in any suitable order still providing the described operations and results. It is therefore contemplated that the present invention cover any and all modifications, variations or equivalents that fall within the spirit and scope of the basic underlying principles disclosed above and claimed herein.

What is claimed is:

1. A method for measuring a sensitivity level of a data packet signal receiver having a sensitivity characteristic defined by an expected packet error rate (PER) versus a data packet signal power level, comprising:
receiving, with said data packet signal receiver, a single transmission of a data packet signal including a group of data packets, wherein first and second portions of said group of data packets have correspondingly first and second data packet power levels which are greater than and less than, respectively, a predetermined power level;
computing, at least in part with said data packet signal receiver, from said received first and second portions of said group of data packets a cumulative number of correctly received data packets; and
following reception of all of said group of data packets, including said cumulative number of correctly received data packets, determining a single expected PER of said data packet signal receiver based on said cumulative number of correctly received data packets.

2. The method according to claim 1, wherein said determining includes:
selecting one of a plurality of pre-constructed data structures; and
comparing said cumulative number of correctly received data packets to said selected one of a plurality of pre-constructed data structures to determine said single expected PER versus said data packet signal power level.

3. The method according to claim 1, further comprising:
receiving a third portion of said group of data packets having a third data packet power level which is substantially equal to said predetermined power level; and
computing said cumulative number of correctly received data packets from the received first, second, and third portions of said group of data packets.

4. The method according to claim 3, wherein said determining includes:
selecting one of a plurality of pre-constructed data structures; and
comparing said cumulative number of correctly received data packets to said selected one of a plurality of pre-constructed data structures to determine said single expected PER versus said data packet signal power level.

5. A method for measuring a sensitivity level of a data packet signal receiver having a sensitivity characteristic defined by an expected packet error rate (PER) versus a data packet signal power level, comprising:
receiving, with said data packet signal receiver, a single transmission of a data packet signal including a group of data packets, wherein each of at least two portions of said group of data packets have different data packet power levels;
computing, at least in part with said data packet signal receiver, from said received at least two portions of said group of data packets a cumulative number of correctly received data packets; and
following reception of all of said group of data packets, including said cumulative number of correctly received data packets, determining a single expected PER of said data packet signal receiver based on said cumulative number of correctly received data packets.

6. The method according to claim 5, wherein said determining includes:
selecting one of a plurality of pre-constructed data structures; and
comparing said cumulative number of correctly received data packets to said selected one of a plurality of pre-constructed data structures to determine said single expected PER versus said data packet signal power level.

7. The method according to claim 5, further comprising transmitting said data packet signal.

8. The method according to claim 7, wherein a baseband representation of a data packet signal is scaled to produce scaled baseband data packets, and the scaled baseband data packets are converted and transmitted as the transmitted at least two portions of said group of data packets.

9. The method according to claim 8, wherein said baseband representation of a data packet signal is a digital representation, the scaled baseband data packets are scaled digital data packets, and the scaled digital data packets are converted by a digital-to-analog converter (DAC).

10. The method according to claim 8, wherein the scaled baseband data packets are stored in a memory for later retrieval for said converting and transmitting.

11. The method according to claim 10, wherein the stored scaled baseband data packets are converted and repeatedly transmitted for a predetermined number of times to produce the transmitted at least two portions of said group of data packets.

12. A method for measuring a sensitivity level of a data packet signal receiver having a sensitivity characteristic defined by an expected packet error rate (PER) versus a data packet signal power level at an associated bit-rate modulation, comprising:
receiving, with said data packet signal receiver, a single transmission of a data packet signal including a group of data packets, wherein first and second portions of said group of data packets have substantially equal data packet power levels and correspondingly first and second bit-rate modulations which are greater than and less than, respectively, a predetermined bit-rate modulation;

computing, at least in part with said data packet signal receiver, from said received first and second portions of said group of data packets a cumulative number of correctly received data packets; and following reception of all of said group of data packets, including said cumulative number of correctly received data packets, determining a single expected PER of said data packet signal receiver based on said cumulative number of correctly received data packets.

13. The method according to claim 12, further comprising:

receiving a third portion of said group of data packets having a data packet with a power level substantially equal to the power level of data packets in the first and second portions, the third portion having a third bit-rate modulation substantially equal to said predetermined bit-rate modulation; and computing said cumulative number of correctly received data packets from the received first, second, and third portions of said group of data packets.

14. A method for measuring a sensitivity level of a data packet signal receiver having a sensitivity characteristic defined by an expected packet error rate (PER) versus a data packet signal power level at an associated bit-rate modulation, comprising:

receiving, with said data packet signal receiver, a single transmission of a data packet signal including a group of data packets, wherein at least two portions of said group of data packets have substantially equal power levels, and each of said at least two portions have different bit-rate modulations;

computing, at least in part with said data packet signal receiver, from said received at least two portions of said group a cumulative number of correctly received data packets; and following reception of all of said group of data packets, including said cumulative number of correctly received data packets, determining a single expected PER of said data packet signal receiver based on said cumulative number of correctly received data packets.

15. The method according to claim 14, wherein at least one of said at least two portions has a bit-rate modulation below a predetermined bit-rate modulation, and at least one of said at least two portions has a bit-rate modulation above the predetermined bit-rate modulation.

16. A method for measuring a sensitivity level of a data packet signal receiver having a sensitivity characteristic defined by an expected packet error rate (PER) versus a data packet signal power level at an associated bit-rate modulation, comprising:

receiving, with said data packet signal receiver, a single transmission of a data packet signal including a group of data packets, wherein at least two portions of said group of data packets have substantially the same power level and bit-rate modulation, and at least another two portions of said group of data packets have different power levels and bit-rate modulations;

computing, at least in part with said data packet signal receiver, from said received at least two portions of said group a cumulative number of correctly received data packets; and following reception of all of said group of data packets, including said cumulative number of correctly received data packets, determining a single expected PER of said data packet signal receiver based on said cumulative number of correctly received data packets.

17. The method according to claim 16, wherein at least one of said at least two portions has a bit-rate modulation below a predetermined bit-rate modulation and a power level below a predetermined power level, and at least one of said at least two portions has a bit-rate modulation above the predetermined bit-rate modulation and a power level above the predetermined power level.

\* \* \* \* \*